US009030164B2

(12) United States Patent
Mitsutani

(10) Patent No.: US 9,030,164 B2
(45) Date of Patent: May 12, 2015

(54) VEHICLE

(75) Inventor: Noritake Mitsutani, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 409 days.

(21) Appl. No.: 13/580,652

(22) PCT Filed: Feb. 23, 2010

(86) PCT No.: PCT/JP2010/052692
§ 371 (c)(1),
(2), (4) Date: Aug. 22, 2012

(87) PCT Pub. No.: WO2011/104808
PCT Pub. Date: Sep. 1, 2011

(65) Prior Publication Data
US 2012/0313581 A1 Dec. 13, 2012

(51) Int. Cl.
*H02J 7/00* (2006.01)
*B60L 3/00* (2006.01)
*B60L 11/18* (2006.01)
*B60K 6/445* (2007.10)
*B60L 11/12* (2006.01)
*B60L 11/14* (2006.01)

(52) U.S. Cl.
CPC .......... *B60L 11/1816* (2013.01); *B60K 6/445* (2013.01); *B60L 3/003* (2013.01); *B60L 3/0092* (2013.01); *B60L 11/123* (2013.01); *B60L 11/14* (2013.01); *B60L 2230/16* (2013.01); *B60L 2250/10* (2013.01); *Y02T 10/6217* (2013.01); *Y02T 10/6239* (2013.01); *Y02T 10/6269* (2013.01); *Y02T 10/7005* (2013.01); *Y02T 10/7077* (2013.01); *Y02T 10/7088* (2013.01); *Y02T 90/121* (2013.01); *Y02T 90/128* (2013.01); *Y02T 90/14* (2013.01); *Y02T 90/163* (2013.01)

(58) Field of Classification Search
CPC .................. B60L 11/1825; Y02T 10/7088
USPC .................................. 320/104, 109
See application file for complete search history.

(56) References Cited

U.S. PATENT DOCUMENTS

2008/0238356 A1* 10/2008 Batson et al. ............ 320/103
2009/0040068 A1* 2/2009 Oyobe et al. ............ 340/932.2
2010/0225274 A1 9/2010 Fujitake

FOREIGN PATENT DOCUMENTS

| JP | 10-006885 A | 1/1998 |
| JP | 2009-065728 A | 3/2009 |
| JP | 2009-100565 A | 5/2009 |
| JP | 2009-189154 A | 8/2009 |
| WO | 2008/153173 A1 | 12/2008 |

OTHER PUBLICATIONS

International Search Report mailed May 18, 2010 of PCT/JP2010/052692.

* cited by examiner

*Primary Examiner* — Sun Lin
(74) *Attorney, Agent, or Firm* — Kenyon & Kenyon LLP

(57) ABSTRACT

A vehicle is a vehicle in which a high-voltage power supply can be charged with electric power from an external power supply. In a travel mode, a main microcomputer (MMC) of a controller outputs a request signal requesting to forcibly turn a plug-in main relay (PIMR) on to a sub-microcomputer (SMC), in order to activate a charging system that is essentially not required to be activated. Upon receiving the request signal, the SMC outputs a signal for turning the PIMR on to the PIMR. If the MMC does not receive electric power from a low-voltage power supply via the PIMR after outputting the request signal, the MMC determines that there is an abnormality in an activation circuit for the charging system, and alerts a user.

6 Claims, 7 Drawing Sheets

VEHICLE

This is a 371 national phase application of PCT/JP2010/052692 filed 23 Feb. 2010, the contents of which are incorporated herein by reference.

TECHNICAL FIELD

The present invention relates to a technique of detecting, in a vehicle in which an internal power storage device can be charged with an external power supply, whether or not an abnormality resulting in inability to charge the internal power storage device from the external power supply has occurred.

BACKGROUND ART

Japanese Patent Laying-Open No. 2009-189154 (PTL 1) describes an electrically powered vehicle in which a power storage device provided inside the vehicle can be charged with electric power supplied from an external power supply, which includes a controller for identifying an abnormality in a charging path during charging of the power storage device from the external power supply. If a current input from the external power supply substantially become zero and a voltage input from the external power supply is not an alternating-current voltage in accordance with the external power supply during charging, this controller identifies an abnormality as occurring in the charging path outside the vehicle. If a current input from the external power supply substantially become zero and a voltage input from the external power supply is an alternating-current voltage in accordance with the external power supply during charging of the power storage device from the external power supply, on the other hand, the controller identifies an abnormality as occurring in the charging path inside the vehicle. With such identification of abnormality, reliable fail-safe and repair can be subsequently implemented.

CITATION LIST

Patent Literature

PTL 1: Japanese Patent Laying-Open No. 2009-189154

SUMMARY OF THE INVENTION

Technical Problem

In PTL 1, as described above, the controller performs a process of identifying an abnormality in the charging path during charging of the power storage device with the external power supply. If the controller does not become active during charging due to failure of a power supply switch or the like, however, the process itself of identifying an abnormality in the charging path cannot be performed.

The present invention was made to solve the above problem, and an object of the present invention is to detect before charging, in a vehicle in which an internal power storage device can be charged with an external power supply, whether or not an abnormality resulting in inability to charge the internal power storage device with the external power supply has occurred.

Solution to Problem

A vehicle according to the present invention is a vehicle capable of being connected to an external power supply. This vehicle includes a first power storage device storing electric power for obtaining a driving force of the vehicle, a charger performing a charging process for charging the first power storage device with electric power from the external power supply, a first power supply switch turned on in response to connection operation of connecting the external power supply to the vehicle by a user, to supply electric power for rendering the charger active to the charger, and a controller rendered active in response to operation by the user different from the connection operation. The controller forcibly outputs an ON signal for turning the first power supply switch on to the first power supply switch while being active in response to the different operation, and determines whether or not an abnormality resulting in inability to perform the charging process has occurred based on whether or not the first power supply switch has been turned on in response to the ON signal.

Preferably, the different operation is start operation for allowing the vehicle to be ready to travel. The controller outputs the ON signal to the first power supply switch while being active in response to the start operation and if the external power supply and the vehicle are not connected to each other.

Preferably, the controller determines that the abnormality has occurred if the first power supply switch is not turned on in response to the ON signal, and alerts the user to occurrence of the abnormality.

Preferably, the vehicle further includes a second power storage device storing electric power for rendering the charger and the controller active, and a second power supply switch provided between the controller and the second power storage device, and turned on in response to the different operation. The charger is connected to the second power storage device via the first power supply switch. The controller outputs the ON signal to the first power supply switch while the second power supply switch is ON.

Preferably, the controller includes a main device connected to the second power storage device via the first power supply switch, and connected to the second power storage device via the second power supply switch, and a subdevice connected to the second power storage device all the time, and rendering the main device active by outputting the ON signal to the first power supply switch in response to the connection operation. The main device outputs a request signal requesting to forcibly turn the first power supply switch on to the subdevice while the second power supply switch is ON. The subdevice forcibly outputs the ON signal to the first power supply switch if the subdevice receives the request signal from the main device.

Preferably, the controller outputs an OFF signal for turning the first power supply switch off while the first power supply switch and the second power supply switch are ON, and if it is not detected that the first power supply switch has been turned off in response to the OFF signal, determines that an abnormality of the first power supply switch being fixed in an ON state has occurred.

Advantageous Effects of Invention

According to the present invention, in a vehicle in which an internal power storage device can be charged with an external power supply, whether or not an abnormality resulting in inability to charge the internal power storage device with the external power supply has occurred can be detected before charging.

DESCRIPTION OF EMBODIMENTS

Embodiments of the present invention will be described hereinafter with reference to the drawings. It is noted that the same components have the same signs allotted thereto in the following description. The names and functions thereof are also the same. Thus, detailed descriptions thereof will not be repeated.

First Embodiment

Figure 1:
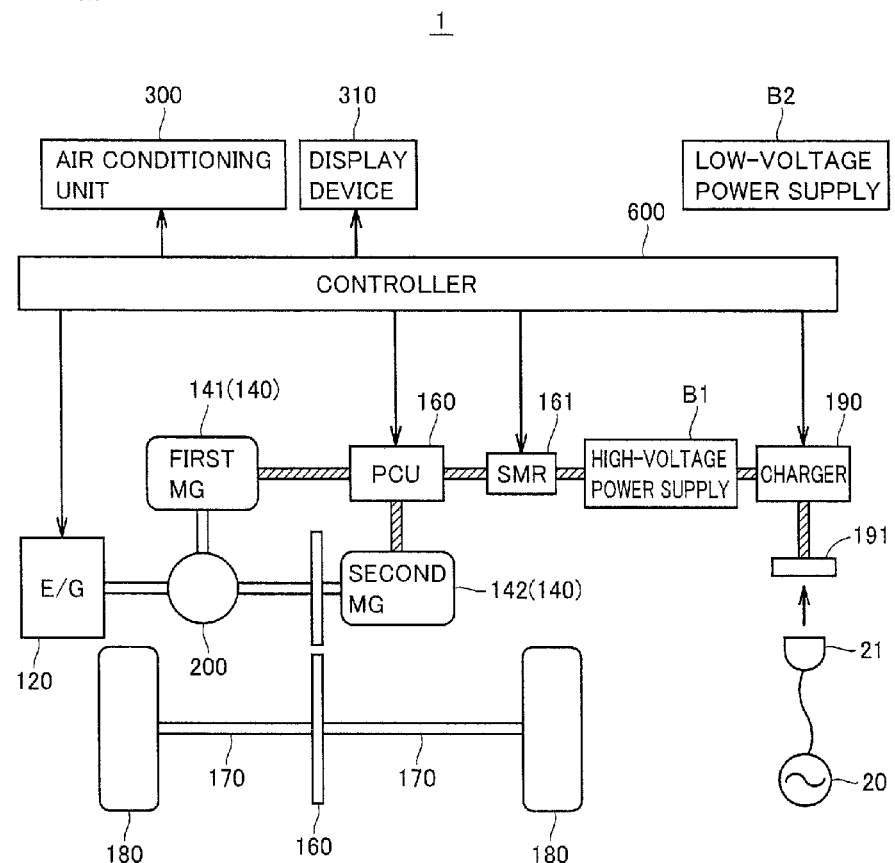
FIG. 1 is a schematic structure diagram of a vehicle including a controller according to this embodiment.

FIG. 1 is a schematic structure diagram of a vehicle 1 including a controller according to this embodiment. Vehicle 1 includes an engine 120, a first motor generator ("motor generator" will be referred to as "MG" hereinafter) 141, and a second MG 142. In the following description, "MG 140" is written when describing first MG 141 and second MG 142 without distinguishing them. Vehicle 1 is a hybrid vehicle that travels with motive power from either engine 120 or MG 140.

Vehicle 1 further includes a high-voltage power supply B1, a low-voltage power supply B2, a power control unit (hereinafter also referred to as "PCU") 160, a power split device 200, an air conditioning unit 300, a display device 310, and a controller 600.

The motive power generated by engine 120 is split into two paths of a drive wheel 180 and first MG 141 by power split device 200.

MG 140 functions as a generator or as a motor, depending on a traveling state of vehicle 1. A rotation shaft of second MG 142 is coupled to drive wheel 180 via a reduction gear 160 and a drive shaft 170.

High-voltage power supply B1 renders MG 140 active, and stores electric power for obtaining a driving force of vehicle 1. High-voltage power supply B1 is representatively a direct-current secondary battery such as a nickel-metal hydride battery or a lithium-ion battery. A large-capacity capacitor may be used instead of the secondary battery. High-voltage power supply B1 has a rated voltage of about 280 volts, for example.

PCU 160 is provided between high-voltage power supply 131 and MG 140. PCU 160 includes therein a converter for converting a voltage between high-voltage power supply B1 and MG 140, an inverter for controlling a current supplied and received between high-voltage power supply B1 and MG 140, and the like.

A system main relay (hereinafter referred to as "SMR") 161 is provided between high-voltage power supply B1 and PCU 160. When SMR 161 is turned on, high-voltage power supply B1 and PCU 160 are electrically connected to each other.

Air conditioning unit 300 performs air conditioning (cooling or heating) of an interior of vehicle 1 in response to a command from controller 600. Air conditioning unit 300 is controlled in a mode of operation which is either normal operation or pre-air conditioning operation. The normal operation is a mode in which air conditioning is performed in response to operation by a user while the user is in vehicle 1. The pre-air conditioning operation is a mode in which air conditioning is performed in response to satisfaction of a prescribed start condition even before the user gets in vehicle 1. The start condition for pre-air conditioning operation is, for example, a condition that it is a time designated by the user, or a condition that remote control requesting start of pre-air conditioning by the user has been detected.

Display device 310 displays various information about a state of vehicle 1, in response to a command from controller 600. The user can check the state of vehicle 1 by looking at the information displayed on display device 310.

Vehicle 1 is a so-called plug-in hybrid vehicle in which high-voltage power supply B1 can be charged with electric power from an external power supply 20. Vehicle 1 thus includes a charging system for charging high-voltage power supply B1 with electric power from external power supply 20. This charging system includes a charger 190 and a charging port 191.

Charging port 191 is an electric power interface for receiving electric power from external power supply 20. When charging high-voltage power supply B1 from external power supply 20, the user connects a connector 21 connected to external power supply 20 to charging port 191. Upon connection of connector 21 to charging port 191, a plug-in signal P is output from charging port 191 to controller 600.

Charger 190 is electrically connected to charging port 191 and high-voltage power supply B1. In a charge mode in which high-voltage power supply B1 is charged from external power supply 20, charger 190 supplies electric power, which is from external power supply 20 and has been converted to electric power capable of charging high-voltage power supply B1, to high-voltage power supply B1.

Low-voltage power supply B2 stores electric power for rendering active the devices such as PCU 160, air conditioning unit 300, charger 190, SMR 161 and display device 310. Low-voltage power supply B2 has a rated voltage of about 12 volts, for example, which is lower than the rated voltage of high-voltage power supply B1. In the following description, the devices rendered active by the electric power supplied from low-voltage power supply B2 are also collectively referred to as "low-voltage devices."

Controller 600 is an electronic control unit (ECU) including a CPU (Central Processing Unit) and a memory which are not shown.

Controller 600 receives signals from a plurality of not-shown sensors (e.g., information indicative of a press-down degree of an accelerator pedal and information indicative of a vehicle speed) via a harness and the like. Controller 600 performs a prescribed computation process based on the signals input from the sensors and information stored in the memory, and controls the low-voltage devices based on the results of the computation process.

Figure 2:
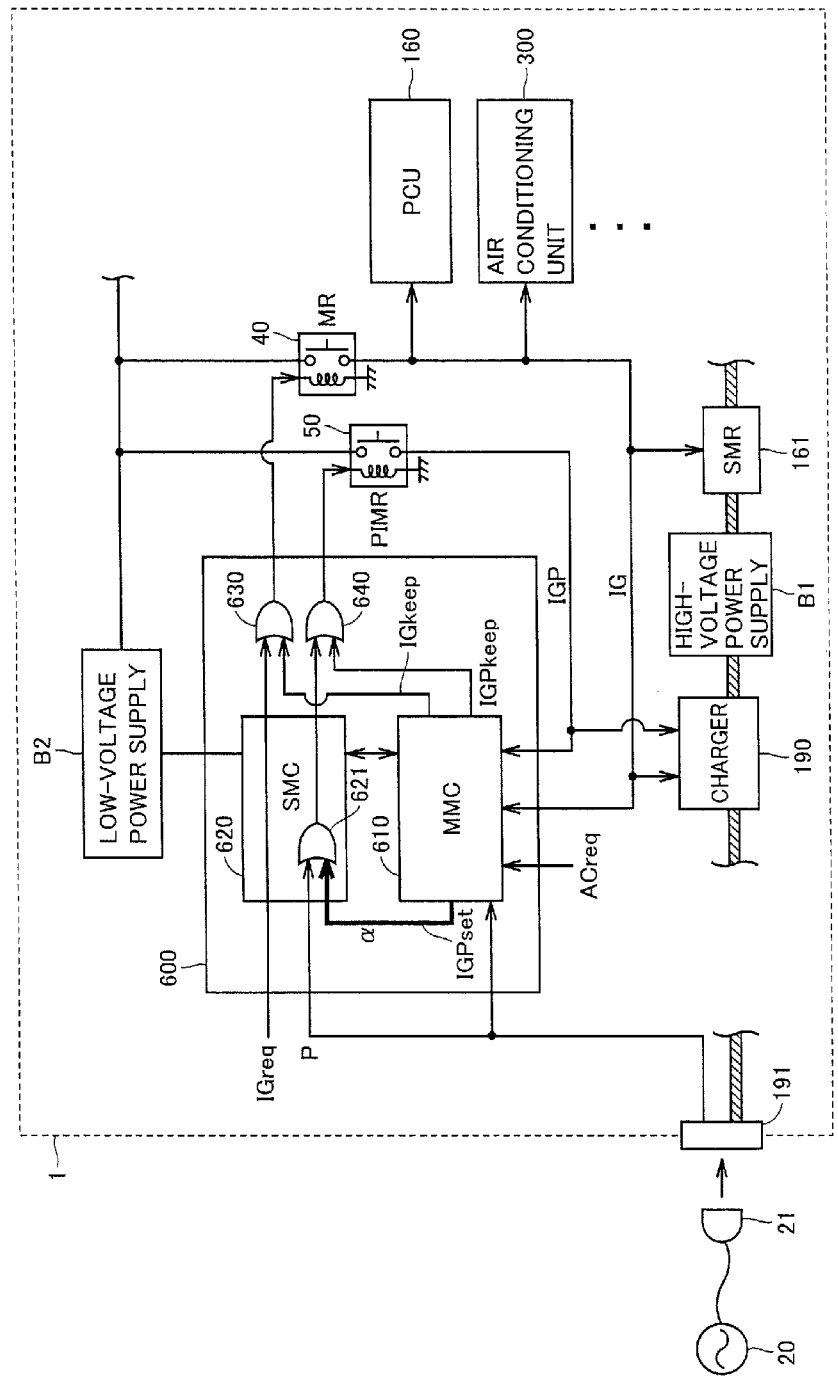
FIG. 2 is a schematic diagram of an activation circuit for low-voltage devices.

FIG. 2 is a schematic diagram of an activation circuit for the low-voltage devices. This activation circuit includes two power supply switches, namely, a main relay 40 (hereinafter referred to as "MR 40") and a plug-in main relay 50 (hereinafter referred to as "PIMR 50").

The low-voltage devices are connected to low-voltage power supply B2 via MR 40. Charger 190 is not only connected to low-voltage power supply B2 via MR 40, but also connected to low-voltage power supply B2 via PIMR 50.

Controller 600 includes a main microcomputer 610 (hereinafter also referred to as "MMC 610") and a sub-microcomputer 620 (hereinafter also referred to as "SMC 620"). SMC 620 includes an OR circuit 621. These circuits also function as the activation circuit for the low-voltage devices.

MMC 610 controls travel and air conditioning of vehicle 1. MMC 610 also functions as part of the charging system, and controls charger 190 to perform charging control of high-voltage power supply B1. Like charger 190, MMC 610 is not only connected to low-voltage power supply B2 via MR 40, but also connected to low-voltage power supply B2 via PIMR 50.

SMC 620, on the other hand, activates the charging system mainly by turning PIMR 50 on. SMC 620 is connected to low-voltage power supply B2 all the time, and is active with low power consumption all the time.

Operation modes of vehicle 1 include a travel mode in which travel and air conditioning of vehicle 1 takes place, and a charge mode in which high-voltage power supply B1 is charged from external power supply 20.

First, the travel mode is described. When it is detected that the user has performed operation requesting the travel mode, an ignition request signal IGreq is input to an OR circuit 630 from another not-shown ECU. The operation requesting the travel mode is, for example, operation of turning a not-shown start switch or ignition switch on in order to start vehicle 1 by the user, or remote control requesting start of pre-air conditioning by the user.

When a state where ignition request signal IGreq has not been input changes to a state where the signal has been input (when ignition request signal IGreq changes from OFF to ON), OR circuit 630 outputs a signal for turning MR 40 on to MR 40. MR 40 is thus turned on.

When MR 40 is turned on, electric power from low-voltage power supply B2 is supplied via MR 40 to the low-voltage devices, to activate the low-voltage devices. For example, SMR 161 changes from OFF to ON, to electrically connect high-voltage power supply B1 to PCU 160. As a result, vehicle 1 enters a state where it can travel with MG 140 (hereinafter also referred to as "Ready-ON state"). In addition, electric power from low-voltage power supply B2 is also supplied to MMC 610. In the following description, the electric power input to MMC 610 via MR 40 from low-voltage power supply B2 is also referred to as "signal IG." MMC 610 is activated upon receiving signal IG.

After receiving signal IG, MMC 610 outputs a signal IGkeep for maintaining the input of signal IG to OR circuit 630. Upon receiving signal IGkeep, OR circuit 630 outputs a signal for turning MR 40 on to MR 40. As a result, MR 40 is maintained in an ON state, and MMC 610 is maintained in an active state. Then, MMC 610 controls operation of the low-voltage devices to cause vehicle 1 to travel in a desired state. In addition, MMC 610 controls air conditioning unit 300 to perform pre-air conditioning operation based on a pre-air conditioning request signal ACreq input from another ECU. This operation mode is the "travel mode."

Next, the charge mode is described. When the user stops vehicle 1 and connects connector 21 to charging port 191 in order to start charging, plug-in signal P is input to MMC 610 and OR circuit 621 in SMC 620 from charging port 191.

When a state where plug-in signal P has not been input changes to a state where the signal has been input (when plug-in signal P changes from OFF to ON), OR circuit 621 outputs a signal for turning PIMR 50 on to PIMR 50 via an OR circuit 640. PIMR 50 is thus turned on, and electric power from low-voltage power supply B2 is supplied via PIMR 50 to the charging system including charger 190 and MMC 610. As a result, the charging system is activated. Here, air conditioning unit 300 and the like not required for charging are not activated, thus suppressing unnecessary power consumption.

In the following description, the electric power input to MMC 610 via PIMR 50 from low-voltage power supply B2 is also referred to as "signal IGP." Accordingly, MMC 610 is activated upon receiving signal IG, and is also activated upon receiving signal TOP.

After receiving signal IGP, MMC 610 outputs a signal IGPkeep for maintaining the input of signal IGP to OR circuit 640. Upon receiving signal IGPkeep, OR circuit 640 outputs a signal for turning PIMR 50 on to PIMR 50. As a result, PIMR 50 is maintained in an ON state, and MMC 610 is maintained in an active state. Then, MMC 610 controls operation of charger 190 to charge high-voltage power supply B1 from external power supply 20. This operation mode is the "charge mode."

As described above, MMC 610 is activated with the change from OFF to ON in ignition request signal IGreq as a trigger in the travel mode, and is activated with the change from OFF to ON in plug-in signal P as a trigger in the charge mode. In either case, MMC 610 cannot activate itself while the vehicle is at rest. Once activated, on the other hand, MMC 610 can maintain itself in an active state by outputting signal IGkeep or signal IGPkeep. In addition, MMC 610 can stop itself by stopping outputting signal IGkeep or signal IGPkeep. For example, when charging of high-voltage power supply B1 is completed in the charge mode, MMC 610 stops outputting signal IGPkeep. PIMR 50 is thus turned off, to stop MMC 610.

In the charge mode, as described above, with the change from OFF to ON in plug-in signal P as a trigger, OR circuit 621 in SMC 620 outputs a signal for turning PIMR 50 on via OR circuit 640. PIMR 50 is thus turned on, to activate the charging system including charger 190 and MMC 610.

If an abnormality occurs anywhere in the activation circuit for the charging system including OR circuits 621, 640 and PIMR 50, however, the charging system including charger 190 and MMC 610 is not activated even upon connection of connector 21 to charging port 191, resulting in inability to charge high-voltage power supply B1 from external power supply 20. Moreover, since MMC 610 itself is not activated, the abnormality in the activation circuit for the charging system cannot be detected and stored to alert the user. In this state, a distance traveled by vehicle 1 with electric power from high-voltage power supply B1 is shortened during travel of vehicle 1, thus putting an unnecessary increased burden on engine 120.

In order to solve such problem, in this embodiment, MMC 610 turns PIMR 50 on at an arbitrary point in time even in the travel mode, to carry out charging system checking for detecting the presence or absence of abnormality in the charging system. This is the most characteristic feature of this embodiment.

More specifically, when a prescribed condition is satisfied in the travel mode, MMC 610 outputs a request signal IGPset requesting to forcibly turn PIMR 50 on to OR circuit 621 in SMC 620 (see arrow α in FIG. 2), in order to activate the charging system that is essentially not required to be activated. Upon receiving request signal IGPset from MMC 610, OR circuit 621 in SMC 620 outputs a signal for turning PIMR 50 on to PIMR 50 via OR circuit 640.

Then, if MMC 610 receives signal IGP after outputting request signal IGPset, MMC 610 determines that the activation circuit for the charging system is normal. If MMC 610 does not receive signal IGP after outputting request signal IGPset, on the other hand, MMC 610 determines that there is an abnormality in the activation circuit for the charging system.

Figure 3:
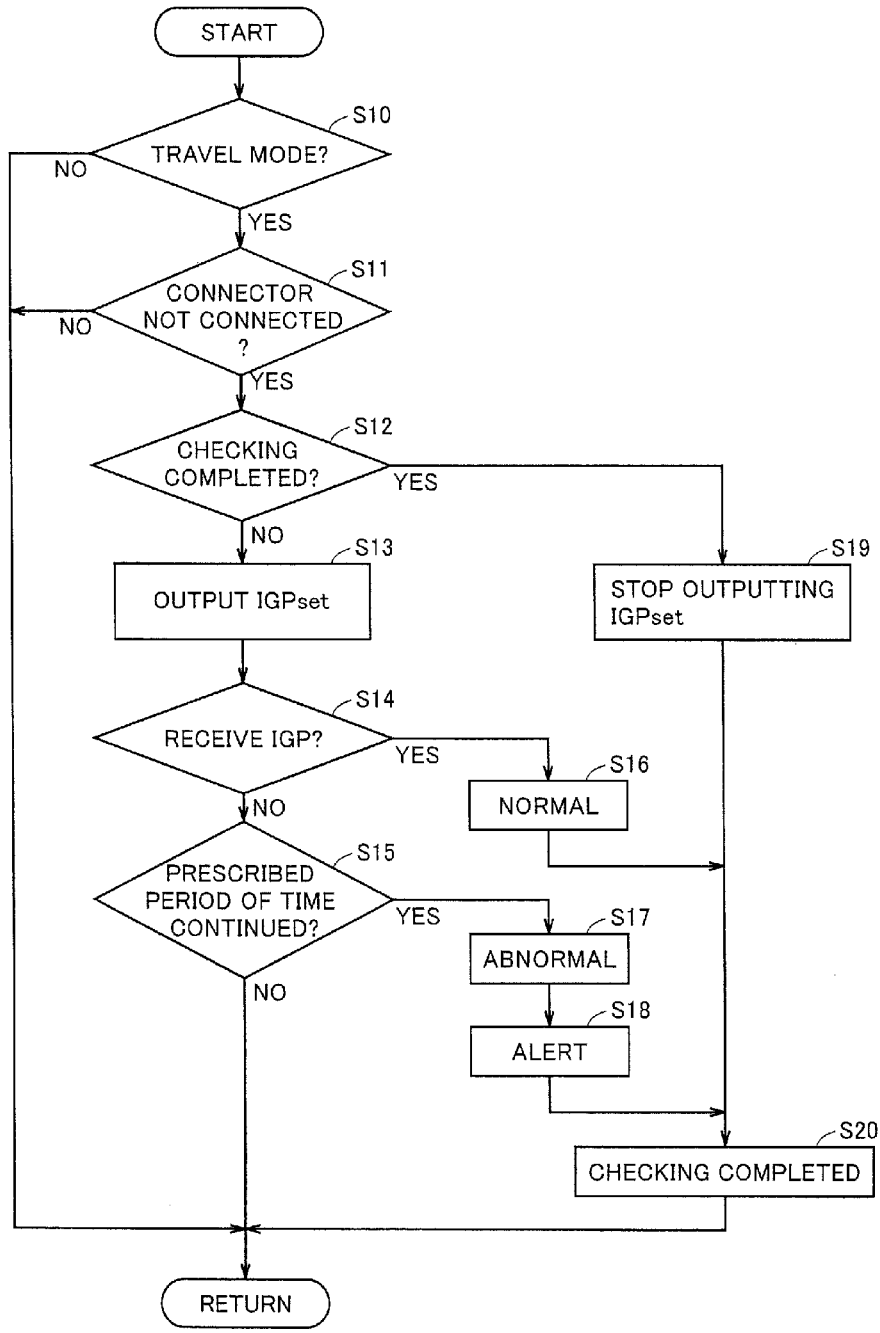
FIG. 3 is a flowchart (No. 1) illustrating a procedure of a main microcomputer.

FIG. 3 is a flowchart illustrating a procedure of MMC 610 when carrying out the charging system checking described above. This flowchart is repeated with a predetermined cycle time. While each step (step will be abbreviated as "S" hereinafter) in the flowchart described below is basically implemented through software processing by MMC 610, it may be implemented through hardware processing by an electronic circuit and the like provided in MMC 610.

In S10, MMC 610 determines whether or not the operation mode is the travel mode. If it is the travel mode (YES in S10), MMC 610 determines that MMC 610 is active in response to operation requesting the travel mode by the user, and proceeds to S11. If not (NO in S10), the process ends.

In S11, MMC 610 determines whether or not connector 21 and charging port 191 are in a non-connected state. This determination is a process for confirming that the charging system is essentially not required to be activated. For example, MMC 610 can determine that connector 21 and charging port 191 are in a non-connected state if plug-in signal P has not been received. Alternatively, MMC 610 can determine that connector 21 and charging port 191 are in a non-connected state if vehicle 1 is actually traveling while exceeding a prescribed speed. Alternatively, MMC 610 can determine that connector 21 and charging port 191 are in a non-connected state when vehicle 1 is in the Ready-ON state described above. If positive determination is made in this process (YES in S11), the process proceeds to S12, and if not (NO in S11), the process ends.

In S12, MMC 610 determines whether or not the charging system checking has been completed during this trip.

If the charging system checking has not been completed during this trip (NO in S12), in S13, MMC 610 outputs request signal IGPset described above to OR circuit 621 in SMC 620 (see arrow cc in FIG. 2).

Then, if MMC 610 receives signal IGP before a lapse of a prescribed period of time after outputting request signal IGPset (YES in S14), in S16, MMC 610 determines that the charging system is normal.

On the other hand, if MMC 610 does not receive signal IGP before a lapse of the prescribed period of time after outputting request signal IGPset (NO in S14, YES in S15), in S17, MMC 610 determines that there is an abnormality in the charging system, and in S18, MMC 610 causes display device 310 to indicate occurrence of the abnormality in the charging system to alert the user. In S20, MMC 610 stores the fact that the charging system checking has been completed during this trip in the memory.

If the charging system checking has been completed (YES in S12), in S19, MMC 610 stops outputting request signal IGPset.

Figure 4:
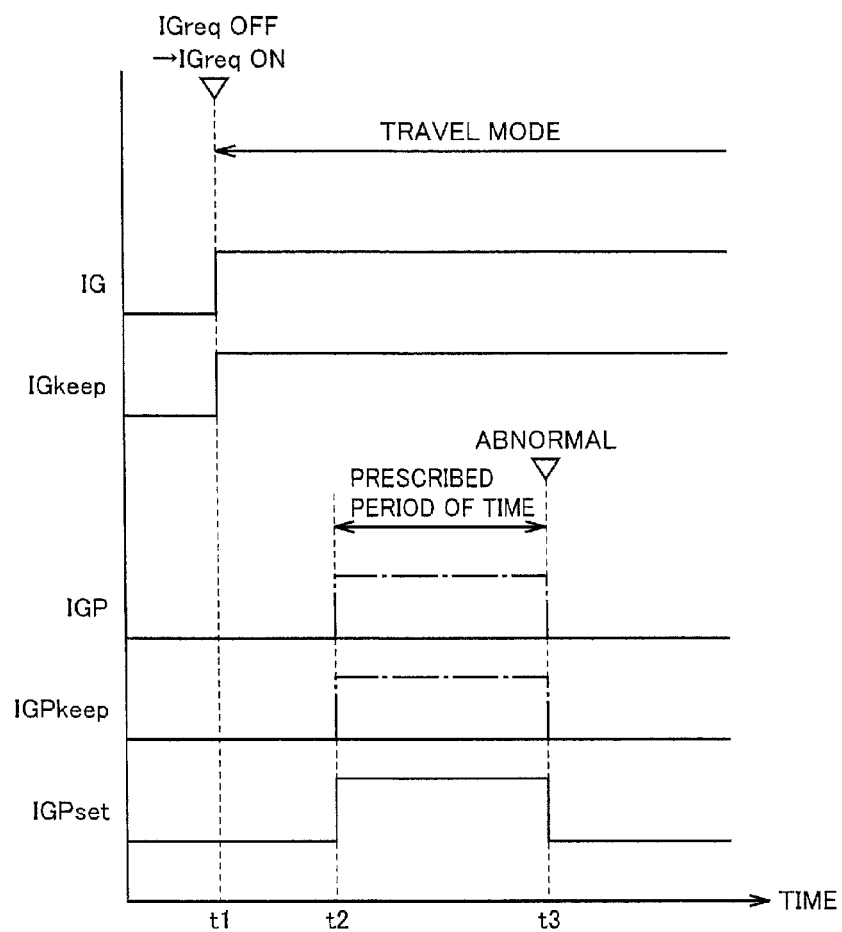
FIG. 4 is a timing chart (No. 1) of signals input to and output from the main microcomputer.

FIG. 4 is a timing chart of signals input to and output from MMC 610 when the user performs operation of turning the start switch on.

At time t1, the user turns the start switch on, causing ignition request signal IGreq to change from OFF to ON. MR 40 is accordingly turned on, to input signal IG to MMC 610. MMC 610 is thus activated. After being activated, MMC 610 outputs signal IGkeep to maintain MR 40 in an ON state. As a result, the operation mode becomes the "travel mode."

Subsequently, at time t2, MMC 610 confirms that connector 21 and charging port 191 are not connected to each other, and outputs request signal IGPset to OR circuit 621 in SMC 620. Upon receiving request signal IGPset, OR circuit 621 outputs a signal for turning PIMR 50 on to PIMR 50 via OR circuit 640.

If the activation circuit for the charging system including OR circuits 621, 640 and PIMR 50 is normally rendered active, PIMR 50 is turned on in response to the output of request signal IGPset, which would cause signal IGP to be input to MMC 610, as indicated with a chain-dotted line in FIG. 4.

If signal IGP has not been input to MMC 610 at time t3 after a lapse of a prescribed period of time after the output of request signal IGPset, as indicated with a solid line in FIG. 4, however, MMC 610 determines that an abnormality has occurred in a portion of the activation circuit for the charging system including PIMR 50. Then, MMC 610 causes display device 310 to indicate occurrence of the abnormality in the activation circuit for the charging system to alert the user.

As described above, in this embodiment, MMC 610 outputs a signal for forcibly turning PIMR 50 on in the travel mode, and detects the presence or absence of abnormality in the charging system based on whether or not PIMR 50 has been turned on thereafter. Accordingly, the presence or absence of abnormality in the charging system can be detected before the user actually starts charging operation. In addition, if an abnormality in the charging system is detected, the user can be alerted to occurrence thereof, and thus can be urged to repair the charging system.

Modification of First Embodiment

In the first embodiment, if it is not detected that PIMR 50 is in an ON state even after a signal for turning PIMR 50 on was output, it is determined that there is an abnormality in the charging system. In addition to this determination, the first embodiment may be modified such that, if it is not detected that PIMR 50 is in an OFF state even after a signal for turning PIMR 50 off was output, it is determined that an abnormality in the charging system, specifically an abnormality of PIMR 50 being fixed in an ON state and unable to be turned off, has occurred.

Figure 5:
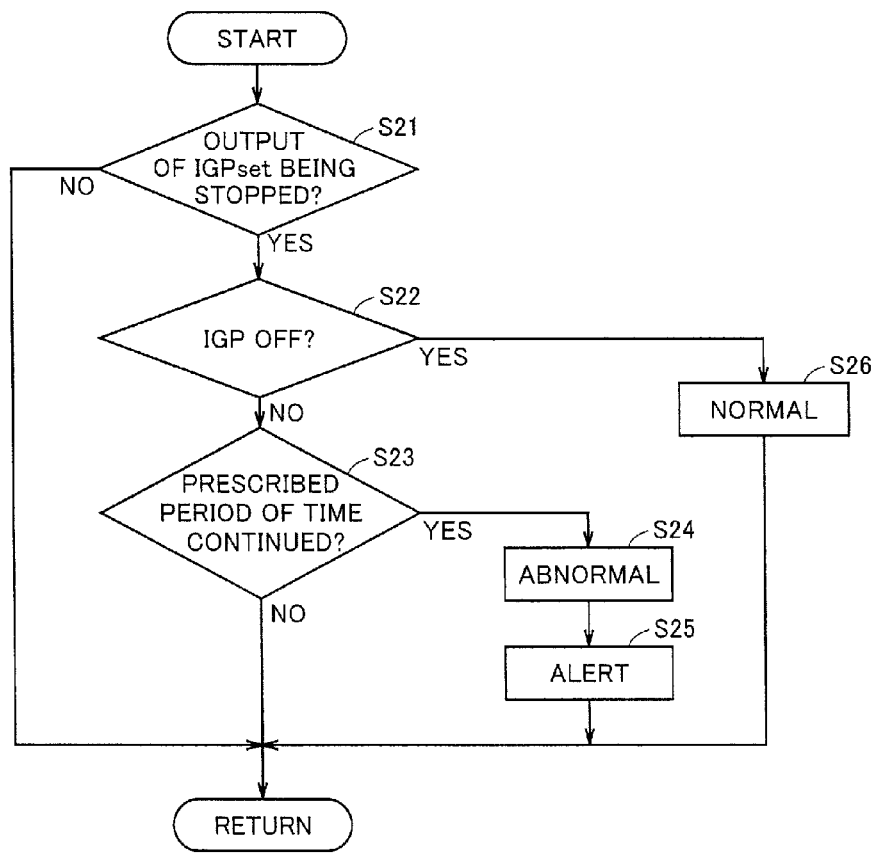
FIG. 5 is a flowchart (No. 2) illustrating a procedure of the main microcomputer.

FIG. 5 is a flowchart illustrating a procedure of MMC 610 in accordance with this modification. The flowchart shown in FIG. 5 is performed in the travel mode in addition to the processing of the flowchart shown in FIG. 3.

In S21, MMC 610 determines whether or not the output of request signal IGPset is being stopped by the process of S19 in FIG. 3 described above.

If the output of request signal IGPset is being stopped (YES in S21), MMC 610 determines whether or not signal IGP has been turned off before a lapse of a prescribed period of time after the output of request signal IGPset was stopped (S22, S23). If signal IGP has been turned off before a lapse of the prescribed period of time after the output of request signal IGPset was stopped, MMC 610 determines that the charging system is normal (YES in S22, S26), and if not, MMC 610 determines that an abnormality resulting in inability to turn PIMR 50 off has occurred, and alerts the user (NO in S22, YES in S23, S24, S25).

In this manner, occurrence of an abnormality resulting in inability to turn PIMR 50 off can be detected to alert the user.

The flowchart shown in FIG. 5 may be performed alone in the charge mode. In this case, in S21 of FIG. 5, whether or not a process of completing the charge mode is being performed, namely, whether or not the output of signal IGPkeep is being stopped may be determined. Then, if reception of signal IGP is not stopped even after the output of signal IGPkeep was stopped, it may be determined that an abnormality of PIMR 50 being fixed in an ON state and unable to be turned off has occurred.

Second Embodiment

The first embodiment described the method of detecting an abnormality in the charging system by utilizing request signal IGPset in the travel mode.

In contrast, a second embodiment describes a method of returning, if the operation mode is switched during the charge mode to the travel mode for the purpose of pre-air conditioning operation, the operation mode to the charge mode again after completion of the pre-air conditioning operation by utilizing requests signal IGPset.

Figure 6:
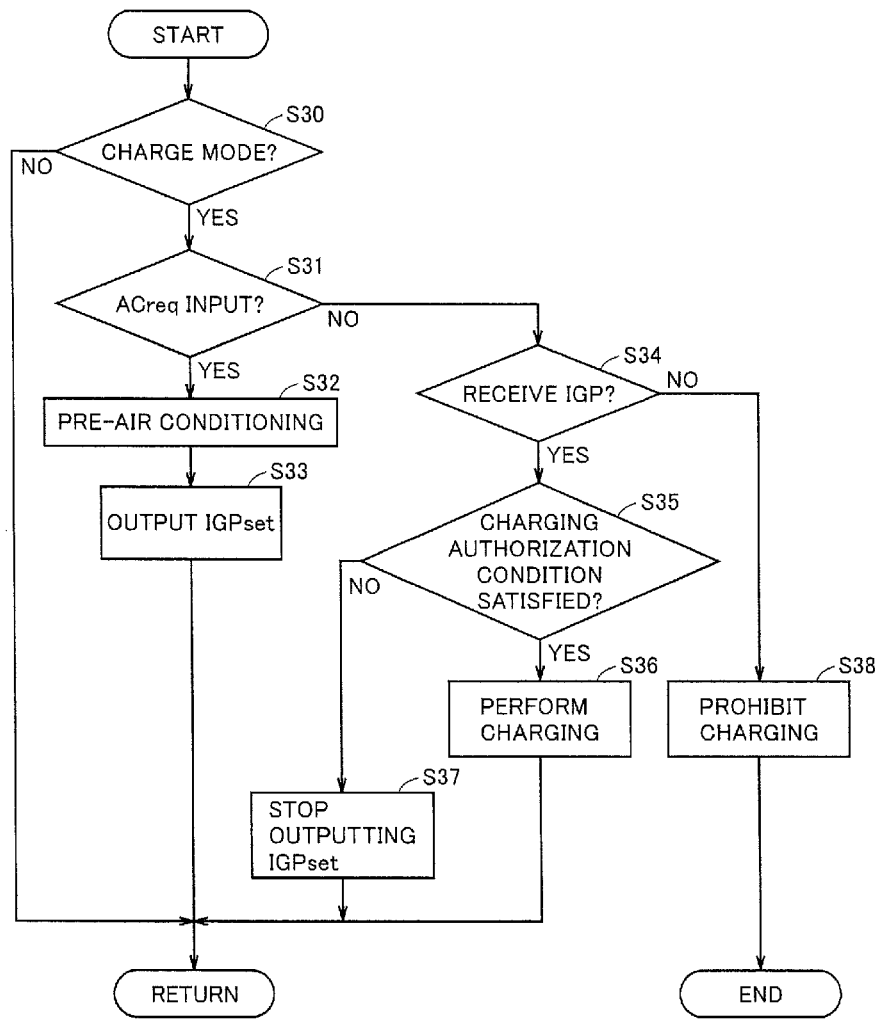
FIG. 6 is a flowchart (No. 3) illustrating a procedure of the main microcomputer.

FIG. 6 is a flowchart illustrating a procedure of MMC 610 in accordance with the second embodiment. This flowchart is repeated with a predetermined cycle time, except for processing after S38.

In S30, MMC 610 determines whether or not the operation mode is the charge mode. If it is the charge mode (YES in S30), the process proceeds to S31. If not (NO in S30), the process ends.

In S31, MMC 610 determines whether or not pre-air conditioning request signal ACreq has been input. If pre-air conditioning request signal ACreq has been input (YES in S31), the process proceeds to S32. If pre-air conditioning request signal ACreq has not been input (NO in S31), the process proceeds to S34. The cases where "pre-air conditioning request signal ACreq has not been input" include both a case where pre-air conditioning request signal ACreq has not been originally input since the user has not requested pre-air conditioning operation, and a case where pre-air conditioning request signal ACreq has changed from ON to OFF due to cancellation by the user, completion of pre-air conditioning operation, a power outage or the like.

In S32, MMC 610 controls air conditioning unit 300 to perform pre-air conditioning operation.

In S33, MMC 610 outputs request signal IGPset to OR circuit 621 in SMC 620 at an arbitrary point in time before completion of the pre-air conditioning operation.

In S34, MMC 610 determines whether or not signal IGP has been received. If signal IGP has been received (YES in S34), the process proceeds to S35. If signal IGP has not been received (NO in S34), the process proceeds to S38.

In S35, MMC 610 determines whether or not a charging authorization condition is satisfied. The charging authorization condition is, for example, a condition that an amount of electric power that has been charged to high-voltage power supply B1 does not exceed a permissible value, and plug-in signal P has been received. If the charging authorization condition is satisfied (YES in S35), the process proceeds to S36. If not (NO in S35), the process proceeds to S37.

In S36, MMC 610 controls charger 190 to charge high-voltage power supply B1 from external power supply 20. Namely, MMC 610 supplies electric power, which is from external power supply 20 and has been converted to electric power capable of charging high-voltage power supply B1, to high-voltage power supply B1.

In S37, MMC 610 stops outputting request signal IGPset.

In S38, MMC 610 prohibits charging of high-voltage power supply B1 from external power supply 20, and stops the subsequent processing.

Figure 7:
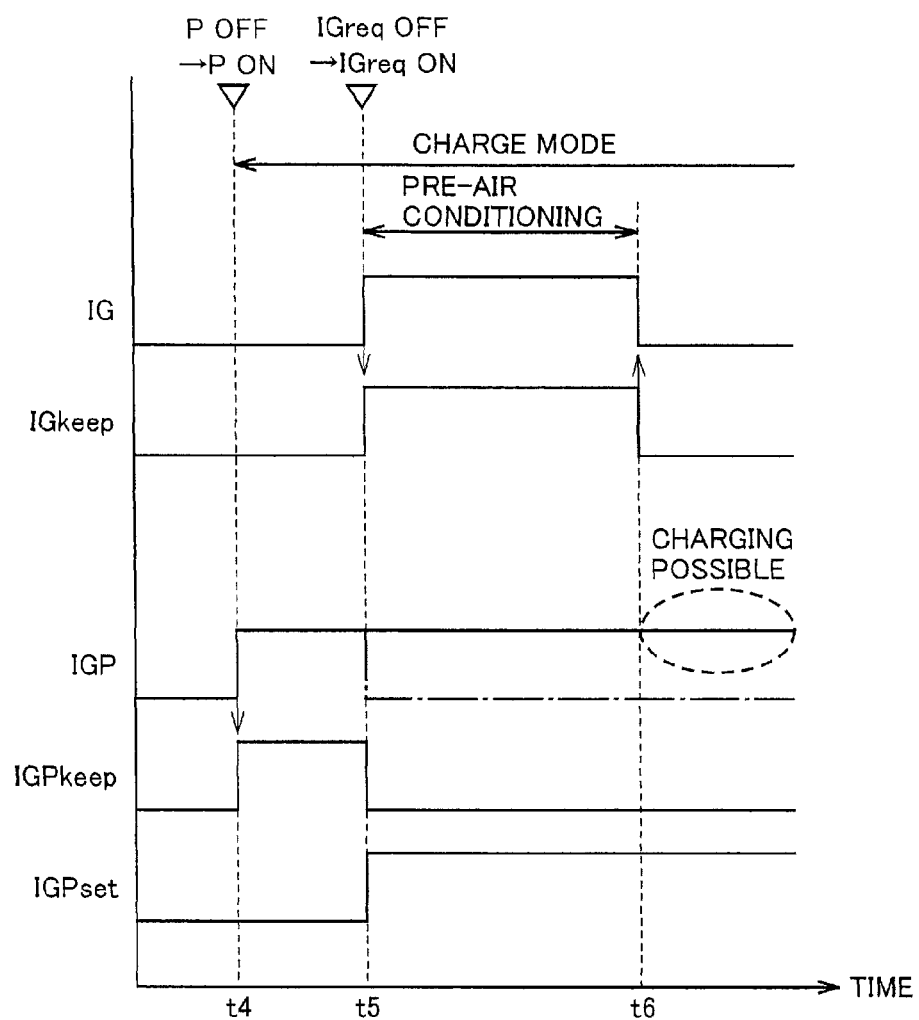
FIG. 7 is a timing chart (No. 2) of the signals input to and output from the main microcomputer.

FIG. 7 is a timing chart of the signals input to and output from MMC 610 when the user requests pre-air conditioning operation by remote control in the charge mode.

First, at time t4, the user connects connector 21 to charging port 191, causing plug-in signal P to change from OFF to ON. PIMR 50 is accordingly turned on, causing signal IGP to be input to MMC 610. MMC 610 is thus activated. After being activated, MMC 610 outputs signal IGPkeep to maintain PIMR 50 in an ON state. As a result, the operation mode becomes the "charge mode."

At time t5 in the charge mode, the user requests pre-air conditioning operation by remote control, causing ignition request signal IGreq to change from OFF to ON. MR 40 is accordingly turned on, to activate air conditioning unit 300 and input signal IG to MMC 610. Upon receiving signal IG, MMC 610 outputs signal IGkeep to maintain MR 40 in an ON state. As a result, the operation mode is switched from the "charge mode" to the "travel mode," and pre-air conditioning operation is performed.

Moreover, at time t5 when the operation mode is switched from the "charge mode" to the "travel mode," MMC 610 stops outputting signal IGPkeep. As a result, conventionally, PIMR 50 is turned off at this point in time, resulting in stop of the input of signal IGP to MMC 610 (see a chain-dotted line in FIG. 7). Conventionally, therefore, when the output of signal IGkeep is stopped and signal IG is also turned off at time t6 when the pre-air conditioning operation is completed, MMC 610 stops. As a result, the operation mode cannot be returned to the charge mode again after completion of the pre-air conditioning operation.

In this embodiment, therefore, at time t5 when the pre-air conditioning operation is started, request signal IGPset is output and the output of signal IGPkeep is maintained. By doing so, even if the output of signal IGkeep is stopped and MR 40 is also turned off at time t6 when the pre-air conditioning operation is completed, PIMR 50 is maintained in an ON state, and MMC 610 is maintained in an active state. Accordingly, the operation mode is returned to the charge mode again after completion of the pre-air conditioning operation.

As described above, in this embodiment, if the operation mode is switched during the charge mode to the travel mode for the purpose of pre-air conditioning operation, MMC 610 forcibly maintains PIMR 50 in an ON state. Thus, even if MR 40 is turned off upon completion of the pre-air conditioning operation, the operation mode can be returned to the charge mode again by maintaining MMC 610 in an active state. Accordingly, charging of high-voltage power supply B1 from external power supply 20 can be continued after completion of the pre-air conditioning operation and before start of vehicle 1 by the user, thereby increasing the distance that can be traveled with electric power from high-voltage power supply B1.

In particular, when performing pre-air conditioning operation by rendering air conditioning unit 300 active with electric power that has been converted from electric power of high-voltage power supply B1, electric power consumed during the pre-air conditioning operation can be replenished after completion of the pre-air conditioning operation, to recover a state of charge of high-voltage power supply B1 to be equal to or higher than a state before the pre-air conditioning operation. Accordingly, reduction in distance that can be traveled with electric power from high-voltage power supply B1 due to the pre-air conditioning operation can be appropriately prevented.

After request signal IGPset was output in the process of S33 in FIG. 6, the charging system checking described in the above first embodiment may be carried out. That is, if signal IGP is received before a lapse of a prescribed period of time after request signal IGPset was output in the process of S33 in FIG. 6, it may be determined that the charging system is normal, and if not, it may be determined that there is an abnormality in the charging system. In this manner, the charging system checking can be carried out even if the operation mode is switched during the charge mode to the travel mode for the purpose of pre-air conditioning operation.

It should be understood that the embodiments disclosed herein are illustrative and non-restrictive in every respect. The scope of the present invention is defined by the tent's of the claims, rather than the description above, and is intended to include any modifications within the scope and meaning equivalent to the terms of the claims.

REFERENCE SIGNS LIST 1 vehicle; 20 external power supply; 21 connector; 40 main relay; 50 plug-in main relay; 120 engine; 160 reduction gear; 170 drive shaft; 180 drive wheel; 190 charger; 191 charging port; 200 power split device; 300 air conditioning unit; 310 display device; 600 controller; 610 main microcomputer (MMC); 620 sub-microcomputer (SMC), 621, 640, 621, 630, 640 OR circuit; B1 high-voltage power supply; B2 low-voltage power supply

The invention claimed is:

1. A vehicle capable of being connected to an external power supply, comprising:
a first power storage device storing electric power for obtaining a driving force of said vehicle;
a charger performing a charging process for charging said first power storage device with electric power from said external power supply;
a first power supply switch turned on in response to a connection operation of connecting said external power supply to said vehicle by a user, to supply electric power for rendering said charger active to said charger; and
a controller rendered active in response to a different operation by the user, the different operation is different from said connection operation,
said controller forcibly outputting an ON signal for turning said first power supply switch on to said first power supply switch while being active in response to said different operation, and determining whether or not an abnormality resulting in inability to perform said charging process has occurred based on whether or not said first power supply switch has been turned on in response to said ON signal.

2. The vehicle according to claim 1, wherein
said different operation is a starting operation for allowing said vehicle to be ready to travel, and
said controller outputs said ON signal to said first power supply switch while being active in response to said start operation and if said external power supply and said vehicle are not connected to each other.

3. The vehicle according to claim 2, wherein
said controller determines that said abnormality has occurred if said first power supply switch is not turned on in response to said ON signal, and alerts the user to occurrence of said abnormality.

4. The vehicle according to claim 1, further comprising:
a second power storage device storing electric power for rendering said charger and said controller active; and
a second power supply switch provided between said controller and said second power storage device, and turned on in response to said different operation, wherein
said charger is connected to said second power storage device via said first power supply switch, and
said controller outputs said ON signal to said first power supply switch while said second power supply switch is ON.

5. The vehicle according to claim 4, wherein
said controller includes
a main device connected to said second power storage device via said first power supply switch, and connected to said second power storage device via said second power supply switch, and
a subdevice connected to said second power storage device all the time, and rendering said main device active by outputting said ON signal to said first power supply switch in response to said connection operation,
said main device outputs a request signal requesting to forcibly turn said first power supply switch on to said subdevice while said second power supply switch is ON, and
said subdevice forcibly outputs said ON signal to said first power supply switch if said subdevice receives said request signal from said main device.

6. The vehicle according to claim 4, wherein
said controller outputs an OFF signal for turning said first power supply switch off while said first power supply switch and said second power supply switch are ON, and if it is not detected that said first power supply switch has been turned off in response to said OFF signal, determines that an abnormality of said first power supply switch being fixed in an ON state has occurred.

* * * * *